Oct. 20, 1970 C. W. H. BARNETT 3,535,686

CERAMIC MEMORY SYSTEM

Filed Dec. 13, 1967

INVENTOR
CHARLES W. H. BARNETT

BY Harry M. Saragovitz, Edward J. Kelly, Herbert Berl & G. L. Lett
ATTORNEYS

United States Patent Office 3,535,686
Patented Oct. 20, 1970

3,535,686

CERAMIC MEMORY SYSTEM

Charles W. H. Barnett, Alexandria, Va., assignor to the United States of America as represented by the Secretary of the Army Filed Dec. 13, 1967, Ser. No. 690,362
Int. Cl. G11c *11/22;* H01v *7/00*
U.S. Cl. 340—173.2 7 Claims

ABSTRACT OF THE DISCLOSURE

A piezoelectric ceramic binary memory system, in which a single ceramic body includes a driver and a plurality of memory units. The body is first polarized over all to a high state of unidirectional domain orientation. Driver electrodes are applied to one area of the body and memory electrodes to other areas of the body thereby defining the memory units. Binary write-in is accomplished by applying a D.C. voltage across a memory unit of the ceramic body, which converts either the unidirectional orientation of the area to a bidirectional orientation or a bidirectional orientation to a unidirectional one, depending on the polarity of the voltage and prior state of orientation. A.C. excitation of the driver results in either a high or low voltage output from each of the memory units, depending upon the state of the domain orientation.

The present invention relates to piezoelectric memory systems. One aspect of the invention relates to a method of obtaining two stable states of polarization for piezoelectric binary information storage; and a second aspect of the invention pertains to an integrated driver, write-in, and read-out piezoelectric structure.

It is generally recognized that a piezoelectric ceramic possesses three identifiable states of polarization: polarization to a high state of domain orientation in one direction, polarization to a high state of domain orientation in the opposite direction, and a random orientation of the domains. When the ceramic body is driven by an oscillator, a highly polarized section of the body generates a relatively high voltage output, while a randomly oriented section generates a relatively low voltage output. The first two states of orientation are easily established in the ceramic body by applying a high D.C. voltage across the body, positive for one direction of polarization and negative for the opposite direction of polarization. However, the state of random orientation is not easily obtained without either monitoring the crystal output, or time calibrating the operation to establish a conversion of orientation from a high state of polarization to some value approximating random orientation.

The present invention facilitates the use of domain orientation to provide a high and low voltage binary read-out, which is not dependent upon either time calibration of the write-in process or monitoring of read-out signal. Instead, it has been found that a piezoelectric ceramic, once polarized to a high state of orientation in one direction by a high D.C. voltage can be reproducibly converted to a state that provides a low output voltage, by the application thereto of a predetermined smaller D.C. write-in voltage of opposite polarity from that of the original polarizing voltage. The smaller voltage can affect only a partial reorientation of the crystal domains, causing a partial orientation in the opposite direction from the initial polarization. Further it is found that the domain orientation can be switched back and forth between the states of high unidirectional polarization and bidirectional domain orientation by applying thereto one or the other polarity of said smaller D.C. voltage. Thus, starting with a unidirectionally polarized ceramic, a binary write-in process is effected simply by applying the smaller D.C. voltage as the write-in signal, one polarity of write-in voltage providing a first binary memory state for the ceramic and the other polarity of said voltage providing the second binary memory state.

Utilizing the foregoing approach for a piezoelectric binary memory system, it is found that the driver, memory, write-in, and read-out structure can be formed as an integrated unit embodied in a single piezoelectric ceramic body; and further, said body can be functionally subdivided into a large number of memory sections or units each with its own write-in and read-out electrodes, but requiring only a single driver for read-out of all the memory sections. Such an integrated system is provided preferably by locating a driver section in the center of a plate-like piezoelectric ceramic body, and distributing discreet write-in and read-out electrodes at different portions of the ceramic body around the driver section. The entire piezoelectric ceramic body is first conditioned with a high degree of polarization or unidirectional domain orientation, by application thereto of a high D.C. voltage. Under this condition, each memory section generates a relatively high voltage output when the driver section is energized by an oscillator. However, if any memory section has applied thereto a smaller predetermined D.C. voltage of opposite polarity from said high initial conditioning D.C. voltage, the orientation of the domains of that section is partially reversed, thereby generating a small read-out voltage when activated by the driver. This memory section can be returned to its high unidirectional polarization condition simply by applying thereto a D.C. voltage equal to said smaller voltage value but of the same polarity as the initial conditioning high D.C. voltage.

It is accordingly one object of the present invention to provide for the write-in, storage, and read-out of binary information in a piezoelectric ceramic body.

Another object of the present invention is to provide for such write-in, storage, and read-out of information based upon a high degree of polarization for one state of binary information, and a predetermined degree of reverse orientation of the polarized domains of the ceramic body for the second state of binary information.

Still another object of the present invention is to provide for such write-in, storage, and read-out of information, utilizing an integrated single ceramic body providing a driver section and a plurality of discreet memory sections.

Other objects and advantages of the present invention will become apparent to those skilled in the art, after a consideration of the following detailed description of one exemplary embodiment of the invention, had in conjunction with the accompanying drawings in which like numerals refer to like or corresponding parts, and wherein.

Figure 1:
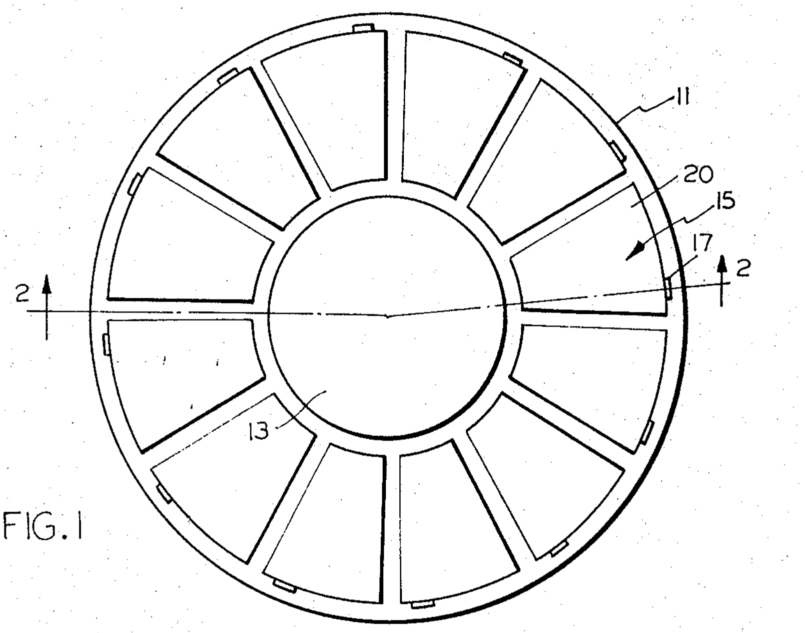
FIG. 1 is a top plan view of an integrated piezoelectric memory system embodying the principles of the present invention.
Figure 2:
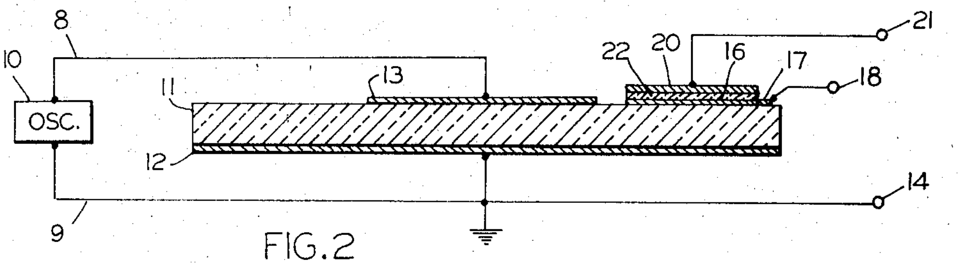
FIG. 2 is a cross-sectional view of said system, taken along the line 2—2 of FIG. 1.

For purpose of illustration, a complete piezoelectric write-in, memory, and read-out system is shown in FIGS. 1 and 2 as comprising a flat circular disc 11 of piezoelectric ceramic material, as the basic element of the system. The entire bottom of the disc 11 is coated with a ground electrode 12, conveniently formed of silver. A central portion of the upper surface of the disc 11 is similarly coated with a silver electrode 13; this is the driver electrode, and functions along with the ground electrode 12 to couple the output of a driver oscillator 10 across the crystal 11, through terminals 8 and 9.

A plurality of identical memory units surrounding the driver electrode 13, twelve units being shown in the drawings for illustration. One of these units is indicated generally by the numeral 15, and will be described in detail as representative of all the memory units. The effective area of memory unit 15 is defined by a silver electrode 16 coated on the upper surface of disc 11. A tab 17 is provided for attaching a terminal 18 to the electrode 16. Electrode 16 is the write-in electrode and functions in conjunction with the common ground electrode 12 to establish the desired domain orientation for that portion of ceramic disc 11 located thereunder.

A silver layer read-out electrode 20 overlies each write-in electrode, and has a read-out terminal 21 connected thereto. The electrode 20 is conductively isolated from write-in electrode 16 by a piezoelectric dielectric 22, but remains capacitively coupled to the common ground electrode 12 through the ceramic disc 11. Thus, when oscillator 10 drives the ceramic body 11 through driver electrode 13, a voltage is generated across readout electrode 20 and ground electrode 12 which is obtained from terminals 21 and 14.

The sandwich structure comprising the disc 11, electrodes 12, 13, 16, and 20, and the dielectric separator 22 are all formed as an integrated and unitary structure, each layer being affixed to the adjacent layer, with the ceramic disc 11 as the structural base. Obviously, the assembly may be mounted on a supporting substrate, such as a circuit board or the like, if desired.

Figure 3:
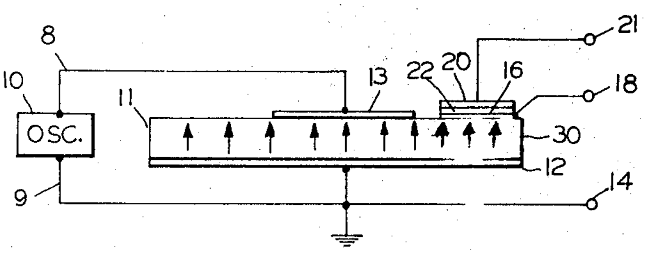
FIG. 3 is a schematic showing of the system of FIGS. 1 and 2, illustrating a first stable binary state of a memory section of the system.
Figure 4:
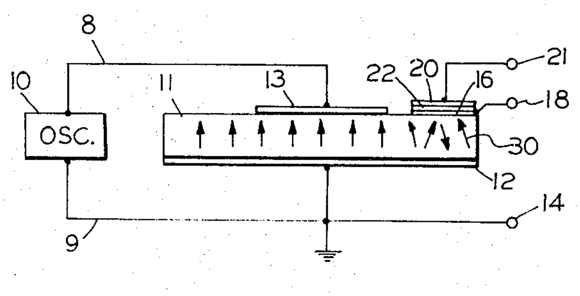
FIG. 4 is a schematic showing of the system of FIGS. 1 and 2, illustrating a second stable binary state of a memory section of the system.

Preferably before the system is assembled, the entire ceramic disc 11 is polarized to a high state of unidirectional domain orientation, by application uniformly over the entire surface area of a high D.C. voltage across the disc 11, as for example of the order of +1000 volts. Therefore, when the system is assembled, all crystal domains are unidirectionally oriented, as schematically indicated by the arrows 30 in FIG. 3. If a smaller D.C. voltage of opposite polarity is applied across a portion of the ceramic disc 11, the orientation of a portion of the domains in that area are reversed to a reproducible extent determined by the voltage magnitude. This may be accomplished in the portion of the disc 11 under the write-in electrode 16, by applying said smaller and opposite polarity voltage to the write-in electrode terminal 18. The partial polarization reversal is indicated schematically by arrows 30 in FIG. 4. When the high orientation D.C. voltage is of the order of +1000 volts, the smaller D.C. voltage may be of the order of −300 volts.. The portion of disc 11 under cell 15 can be returned to its high state of unidirectional domain orientation by applying to write-in electrode 16 a voltage equal in magnitude to said smaller D.C. voltage but of the same polarity as the initial polarizing voltage, i.e. +300 in the illustration given above. Thus, by applying this smaller voltage to write-in electrode 16, the orientation of the portion of the disc 11 thereunder can be switched between a high unidirectional polarization, as shown in FIG. 3, and a bidirectional orientation, as shown in FIG. 4, depending upon the polarity of the applied voltage.

This voltage therefore constitutes a binary input or write-in signal to the memory section or unit 15 of disc 11. The type of polarization thus effected in the memory section will be retained until altered by an opposite polarity write-in signal. Each portion of disc 11 corresponding to memory unit 15 provides a separate and discrete memory section under control of its respective write-in electrode. The response of the memory sections to their respective write-in signals is not a time function, but is substantially only a voltage function determined by the orientation response of the crystal domains of the ceramic disc 11 to applied D.C. voltage.

When a piezoelectric ceramic body is driven by an oscillator, it is, of course, known that its generated output voltage is a function of its domain polarization. Thus, the output voltage from one of the memory portions of disc 11, such as the memory unit 15, is substantially greater when the crystal domains are highly oriented unidirectionally as in FIG. 3, than when these domains are bidirectionally oriented as in FIG. 4. In practice, outputs of the order of 5 to 10 volts peak to peak have been obtained from the read-out electrode 20 when the memory section of disc 11 is highly oriented unidirectionally, as against outputs of the order of only about 0.1 to 0.5 volt peak to peak when the memory section is bidirectionally oriented.

Thus in operation, write-in of binary information is accomplished by applying a positive or negative D.C. signal across memory section 15 of ceramic disc 11, through its write-in terminal 18 and the common ground terminal 14. Similarly, additional binary information is applied to each of the other eleven memory portions of disc 11 through identical write-in electrodes disposed about the periphery of the disc. Read-out of the information stored in the system is had by coupling the output of oscillator 10 through terminals 8 and 9 to the driver and ground electrodes 13 and 12. As a result, a voltage is generated by each of the memory sections of disc 11, providing an output across the respective read-out electrode terminal 21 and the common ground electrode terminal 14. The output obtained from each memory section or unit depends upon the nature of orientation of the crystal domains of the particular memory unit. In each instance where a memory unit of disc 11 is highly unidirectionally oriented, a relatively high voltage is obtained at the read-out terminal; whereas in each instance where a memory unit of disc 11 is bidirectionally oriented, a relatively low voltage is obtained at the read-out terminal.

There is thus presented a method of recording binary information in a piezoelectric ceramic, utilizing as the two binary memory states, one wherein the crystal domains are highly oriented unidirectionally, and the second wherein these domains are bidirectionally oriented. When the crystal is oscillator driven, the first condition provides a relatively high voltage output, and the second condition provides a relatively low voltage output. In addition, there is presented an integrated and unitary driver, memory, write-in, and read-out piezoelectric ceramic system. This system is of course adapted for operating in response to the foregoing memory method, although it is cetrainly not limited thereto.

It is understod that the details of the invention presented in the preceding description are for illustrative purposes only, to facilitate a complete understanding of the invention, and that the invention is not limited to these details. Variations and modifications of the disclosed embodiments of the invention will of course be apparent to those skilled in the art, and such as are embraced by the spirit and scope of the appended claims are contemplated as being within the purview of the present invention.

What is claimed is:

1. A memory system, comprising a piezoelectric ceramic plate-like body, a first electrode applied over one surface of said body, a second electrode applied over a first portion of the opposite surface of the body, a plurality of third electrodes applied over separate additional portions of said opposite surface of said body, a plurality of fourth electrodes each overlying one of said third electrodes, and a dielectric element separating each of said third electrodes from its respective overlying fourth electrode, said body being highly polarized in the area underlying said first electrode to provide a driver for the system in response to an A.C. voltage applied across said first and second electrodes, and said body being differently polarized at areas underlying different ones of said third electrodes, the states of polarization of said body portions underlying said third electrodes being selectively established by the application of D.C. voltages across said first and third electrodes, the last mentioned states of polarization being detectable by the magnitude of voltage generated between said first and fourth electrodes in response to A.C. voltage excitation of said driver.

2. A memory system as set forth in claim 1 wherein said body areas underlying said third electrodes are selectively polarized to two different states of domain orientation.

3. A memory system as set forth in claim 2, wherein said two different states of domain orientation are highly unidirctional and substantially bidirectional.

4. A memory system as set forth in claim 3, wherein said dielectric element is a piezoelectric ceramic element.

5. A memory system, comprising a piezoelectric ceramic plate-like body, a first electrode applied over one surface of said body, a second electrode applied over a first portion of the opposite surface of the body, a plurality of third electrodes applied over separate additional portions of said opposite surface of said body, a plurality of fourth electrodes each overlying one of said third electrodes, and a dielectric element separating each of said third electrodes from its respective overlying fourth electrode, said body in the area underlying said first electrode providing a driver for the system in response to an A.C. voltage applied across said first and second electrodes, and said body being differently polarized at areas underlying different ones of said third electrodes, the states of polarization of said body portions underlying said third electrodes being selectively established by the application of signals across said first and third electrodes, the last-mentioned states of polarization being detectable by the signals generated between said first and fourth electrodes in response to A.C. voltage excitation of said driver.

6. A memory system as set forth in claim 5 wherein said body areas underlying said third electrodes are selectively polarized to two different states of domain orientation.

7. A method of recording and read-out of binary information utilizing a piezoelectric body, comprising first polarizing the crystal domains of said body in a highly unidirectional orientation by applying a first D.C. voltage across said body, thereafter selectively reorienting said domains of a first portion of said body between a substantially bidirectional orientation and said unidirectional orientation by applying D.C. voltages of smaller magnitude than said first voltage across said portion of said body, said smaller D.C. voltages being applied with a polarity opposite from that of said first voltage to effect said bidirectional orientation and with the same polarity as said first voltage to reestablish said unidirectional orientation, applying an A.C. voltage across a second portion of said body, and detecting the voltage generated across said first portion in response to said A.C. voltage, the magnitude of said generated voltage being an indication of the state of orientation of said domains in said first portion of said body.

References Cited

UNITED STATES PATENTS

| | | | |
|---|---|---|---|
| 2,930,906 | 3/1960 | Wolfe | 340—173.2 X |
| 3,015,090 | 12/1961 | Landauer | 340—173.2 |
| 3,197,744 | 7/1965 | Lechner | 340—173.2 |

BERNARD KONICK, Primary Examiner

J. F. BREIMAYER, Assistant Examiner

U.S. Cl. X.R.

310—8.1